United States Patent [19]

Smith et al.

[11] Patent Number: 5,288,171
[45] Date of Patent: Feb. 22, 1994

[54] METHOD OF RECYCLING CONSTRUCTION AND DEMOLITION DEBRIS

[75] Inventors: R. Paul Smith, McLean, Va.; Michael I. Price, Upper Marlboro, Md.

[73] Assignee: Recovermat Technologies, Inc., WIlmington, Del.

[21] Appl. No.: 7,651

[22] Filed: Jan. 22, 1993

Related U.S. Application Data

[63] Continuation-in-part of Ser. No. 883,354, May 15, 1992, which is a continuation-in-part of Ser. No. 871,103, Apr. 20, 1992, Pat. No. 5,181,803.

[51] Int. Cl.$^5$ ............................................. B09B 1/00
[52] U.S. Cl. ........................... 405/129; 241/DIG. 38; 405/128
[58] Field of Search .............. 405/128, 264, 266, 129; 404/82, 16, 17; 241/DIG. 38

[56] References Cited

U.S. PATENT DOCUMENTS

| | | |
|---|---|---|
| 2,015,361 | 7/1934 | Holland . |
| 3,113,014 | 12/1963 | Foth . |
| 3,826,437 | 7/1974 | Warren, Jr. et al. . |
| 4,483,641 | 11/1984 | Stoll . |
| 4,519,338 | 5/1985 | Kramer et al. . |
| 4,793,927 | 12/1988 | Meehan et al. . |
| 4,813,618 | 3/1989 | Cullom . |
| 4,834,300 | 5/1989 | Wojciechowski et al. ..... 405/129 X |

(List continued on next page.)

FOREIGN PATENT DOCUMENTS

| | | | |
|---|---|---|---|
| 0033618 | 2/1983 | Japan .................................. | 405/129 |
| 1172463 | 8/1985 | U.S.S.R. ............................. | 405/129 |

OTHER PUBLICATIONS

Environmental Waste Control Digest, by Alvin R. Jacobson, Public Works, Feb. 1970, p. 114.
Sanitary Landfill: Alternative to the open dump. Environmental Science & Technology, vol. 6, May 1972, pp. 408–410.
"Soil Substitutes Slash Daily-Cover Needs," MSW Management, p. 34 (Mar./Apr. 1992).
"Liner," Waste Age, pp. 30 and 32 (Mar. 1992).
"A Foam Fix for Trash," Chemical Week, p. 12 (Feb. 22, 1989).
"Old Christmas Trees to be Reused," Business Wire (Dec. 12).
"DEQE Must Act to end Abandoned Car Crisis," PR Newswire (Jun. 27, 1988).
"Down in the Dump," Inc., p. 90 (Sep. 1990).
"Final Environmental Impact Report on Artery Project Released," United Press International (Nov. 21, 1990).
"Technology: A New Way to Carve Out Space for Ever-Expanding Piles of Trash", New York Times (Dec. 30, 1990), Sec. 3, p. 9.
"Landfill Uses Old Newspapers as Daily Cover Material," Pollution Engineering, p. 122 (Sep. 1991).
California proposed bill No. AB 1760, The Recorder (Mar. 18).
"Browning-Ferris Industries Officially Breaks Ground for Arbor Hills Center for Resource Management," PR Newswire (Sep. 30).
"Solid Waste-No Place to Go," Foundry Management & Technology, vol. 119, No. 5, p. 47 (May 1991).
"Landfill Laws Dump Business on Fluid Systems'

(List continued on next page.)

Primary Examiner—Dennis L. Taylor

[57] ABSTRACT

A method of recycling construction and demolition debris produces a product useful in earth engineering applications, including landfills, soil stabilization and roadbeds. The method involves wet shredding construction and demolition debris into a moist shredded product and applying the product as daily cover for a landfill, or in a roadbed, or as a soil stabilizer or nutrient. A landfill design using the recycled product is also disclosed.

16 Claims, 2 Drawing Sheets

U.S. PATENT DOCUMENTS

| | | |
|---|---|---|
| 4,877,531 | 10/1989 | Burkett . |
| 4,909,667 | 3/1990 | DeMello . |
| 4,927,317 | 5/1990 | Acosta . |
| 4,973,196 | 11/1990 | Fuhr et al. . |
| 5,024,770 | 6/1991 | Boyd et al. ................... 405/129 X |
| 5,040,920 | 8/1991 | Forrester ............................ 405/129 |
| 5,048,764 | 9/1991 | Flament . |
| 5,051,031 | 9/1991 | Schumacher et al. . |
| 5,054,406 | 10/1991 | Judd ................................ 405/129 X |
| 5,054,962 | 10/1991 | Bahnmuller et al. .............. 405/129 |
| 5,090,843 | 2/1992 | Grigsby . |
| 5,143,481 | 9/1992 | Schumacher et al. .............. 405/129 |
| 5,152,467 | 10/1992 | Hwang . |

OTHER PUBLICATIONS

Doorstep," Cincinnati Business Courier, vol. 8, No. 47, Sec. 1, p. 9 (Mar. 30, 1992).

"New York State Eves Paper Mill Sludge as Alternative Landfill Integrated Waste Management", p. 7 (Apr. 15, 1992).

"Right From Your Backyard: Compost Makes a Comeback," PR Newswire (May 23, 1991), Sports News Section.

"Daily Cover is Where you Find It," Waste Age, p. 125 (Feb. 1988).

"Chemfix-Technologies: CFIX Announces Massachusetts Contract Worth $5.5 Million," Business Wire (Aug. 24, 1988).

"Maine Town Bucks Tradition in Landfill Capping Project," J. Air Waste Management Assoc., vol. 42, No. 4, p. 419 (Apr. 1992).

"Landfill Cover Helps Save Capacity," Public Works, p. 76 (Feb. 1992).

"To Shred or Not to Shred?" Waste Age, p. 114 (Jun. 1988).

"An In-Depth Look at Landfill Covers," Waste Age, p. 135 (Aug. 1987).

"Land Application of Waste Materials," Soil Conservation Society of America, pp. 175-178 at p. 176 (1976); TP995.56.

Carson, David A., "Municipal Solid Waste Landfill Daily Cover Alternatives," U.S. EPA-Risk Reduction Engineering Laboratory, p. 296 December.

40 C.F.R. Parts 257 and 258, Final Rule (promulgated Oct. 9, 1991, effective Oct. 9, 1993, except subpart G of Part 258 effective Apr. 9, 1994).

"Alternative Daily Cover Materials for Municipal Solid Waste Landfills", PRC Environmental Mgmt., Inc. McLean, Va. (Jun. 1, 1992).

Boeger, K. E., "Mill Fuel and Mill Cover Recycled Products from Shredder Fluff," Resources and Conservation (Mar. 14, 1987), from.

"Material and Energy from Refuse", Selection of Papers Presented at the 3rd. Int. Symp., Antwerp, Belgium, Mar. 18-20, 1986, pp. 133-138.

Graven, Johannes T., "Urea-formaldehyde Foan as a Landfill Cover Material: Simulated Landfill Investigations," Waste Management Res., vol. 5, No. 1, pp. 41-53 (Mar. 1987).

Salimando, Joe, "Awesome or Awful?" Waste Age, p. 80 (Jan. 1990).

Ham, Robert K., "Refuse Milling for Landfill Disposal," technical report presented at the Solid Waste Symposium, Cincinnati, Ohio p. 37(31) (May 4-6, 1971).

METHOD OF RECYCLING CONSTRUCTION AND DEMOLITION DEBRIS

CROSS-REFERENCE TO RELATED APPLICATIONS

This is a continuation-in-part of U.S. Pat. application Ser. No. 07/883,354 filed May 15, 1992, which is a continuation-in-part of U.S. Pat. application Ser. No. 07/871,103 filed Apr. 20, 1992, now U.S. Pat. No. 5,181,803.

FIELD OF THE INVENTION

The present invention relates to a method of recycling construction and demolition debris. More particularly, the invention relates to a method of recycling construction and demolition debris into an article useful in earth engineering applications, such as municipal solid waste landfills, roadbeds, soil stabilization, soil erosion control and the like.

BACKGROUND OF THE INVENTION

Federal and state environmental regulations require the operators of sanitary landfill operations to periodically cover disposed solid waste with six inches of earthen material to control disease, insects, fires, odors, blowing litter, and scavenging. For example, most jurisdictions require such covering of sanitary landfills at the end of each operating day, or at more frequent intervals if necessary. This covering requirement and the cover material is known as "daily cover" or "periodic cover" where the regulatory interval is more than one day, e.g., three days. As used herein, "daily cover" is intended to include daily and periodic cover for sanitary landfills, such as municipal solid waste (MSW) landfills, rubble landfills, land clearing debris landfills, and industrial waste landfills.

Each day's garbage, trash or rubble layer is covered at the end of the day and further garbage, trash or rubble layers are then spread directly on top of the daily cover from the previous day. In many landfill sites the soil used for the daily cover must be mined at the landfill site or purchased from an outside source and, due to the high rate of soil consumption, comprises a substantial cost item. Moreover, it has been recognized that multiple earth fill layers used in this way consume a significant volume of the valuable landfill space which might otherwise be used for receiving garbage, trash or rubble. It is well known that many communities are rapidly exhausting their available landfill acreage and it is therefore desirable to reduce the consumption rate of the available landfill volume. Accordingly, federal and state regulations allow alternative, more compressible, daily cover materials in lieu of the six inches of earthen material so long as the alternative materials provide the requisite level of protection.

One known solution to reducing the volume of municipal solid waste landfills is to shred the municipal solid waste to achieve a greater filling density in the landfill. One example of this solution is disclosed in U.S. Pat. No. 4,834,300 to Wojciechowski et al. which describes a process of reducing municipal solid waste to dry particles of a relatively small, uniform size to be mixed with the earth of a landfill for minimizing settlement and maximizing the load support capabilities of the landfill. While this process for forming a municipal solid waste landfill may be acceptable in some jurisdictions, it does not provide the daily cover required by the great majority of jurisdictions.

Some jurisdictions permit disposal of municipal solid waste in a landfill in shredded form without a requirement for daily cover. Although this method for disposal is accepted in some instances, it still has serious health and environmental drawbacks compared to landfills which require daily cover.

The prior art also does not adequately address the problem of disposing of construction and demolition debris in an efficient, useful and/or space saving manner. Rubble landfills in which construction and demolition debris is typically disposed consume a substantial volume of available landfill space. It would be desirable therefore to provide a method of recycling construction and demolition debris in a way which eliminates the need for rubble landfills and in which substantially the entire volume of construction and demolition debris can be recycled and made use of in other earth engineering applications.

SUMMARY AND OBJECTS OF THE INVENTION

In view of the foregoing limitations and shortcomings of the prior art, as well as other disadvantages not specifically mentioned above, it should be apparent that there still exists a need in the art for an a method of recycling construction and demolition debris in an efficient, cost effective, and space saving manner, and especially a method in which recycled construction and demolition debris can be effectively utilized in various earth engineering applications.

More particularly, it is an object of this invention to provide a new municipal solid waste landfill construction having a greater density and compressibility than prior art constructions.

It is another object of this invention to provide a product useful in earth engineering applications which includes recycled construction and demolition debris.

Yet another object of this invention is to provide a method of disposing of construction and demolition debris in a manner that is environmentally sound and practical.

The aforementioned objects are accomplished according to the invention by a method of converting or recycling construction and demolition debris into an article for use in earth engineering applications. "Construction and demolition debris," as used herein and as typically defined by state and municipal laws and ordinances, comprises debris associated with the razing of buildings, roads, bridges, and other structures and/or debris associated with the construction of buildings. It typically includes, but is not limited to, ferrous and non-ferrous metals, concrete, bricks, lumber, plaster and plasterboard, insulation material, cement, shingles and roofing material, floor, wall and ceiling tile, asphalt, glass, pipes and wires, carpet, wallpaper, felt and other items physically attached to the structure, including compacted appliances, structural fabrics, paper or cardboard packaging. The foregoing definition of construction and demolition debris is not intended to exclude debris, all or substantially all of which comprises paper, paperboard, paper cartons, cardboard and the like, such as is included, for example, in what is referred to in the art as "commercial waste." Commercial waste typically includes waste from office buildings, business establishments and other commercial enterprises which produce large quantities of paper, paper-based office-type waste and other waste products associated with such commercial enterprises, e.g., wooden crates and packing, metal, strapping, plastic, furniture, office equipment and glass. Thus, commercial waste is intended to be included in construction and demolition debris as that term is used herein. Typically excluded from construction and demolition debris are materials that pose an undue risk to public health or the environment such as industrial waste or byproducts, paint, tar, solvents, creosote, adhesives and the like.

It is not intended that the above listing of specific debris items be all-inclusive of the items of debris which may be incidentally present in construction and demolition debris. It is within the contemplation and scope of the present invention that limited or incidental amounts of other debris items may be present in construction and demolition debris without altering either its essential characteristics as construction and demolition debris or its suitability for recycling according to the method of the invention. Such other debris items may include, e.g., tires, brush and limbs, rock, etc.

In some cases, construction and demolition debris must be deposited in what are commonly known as "rubble" landfills which are required to satisfy stringent design and operational requirements. However, according to the method of the present invention, the construction and demolition debris is converted into a useful product which can be used in many applications, such as a daily cover for a sanitary landfill rather than being disposed of as the contents of the landfill. This daily cover can be used not only for municipal solid waste, land clearing debris and rubble landfills, but also for industrial waste landfills which are subject to even stricter regulation.

Briefly described, the method of the invention comprises the steps of removing large pieces of metal from the debris, compacting the balance of the debris into small pieces, wet shredding the pieces into even smaller particles, separating the ferrous and optionally the non-ferrous metals from the debris utilizing the combination of magnetic, air and/or water separating systems, and dewatering the wet shredded debris to produce a product suitable for the aforementioned applications.

The product of the present invention when used in a landfill also advantageously functions as a more effective filter medium than the conventional earthen daily cover materials thereby resulting in a cleaner leachate arriving at the bottom of a landfill using the product of the invention as daily cover. The product of the method of the invention may thus be used in a landfill as daily cover and as a filter medium. Alternatively, the product may be used as a filter medium to filter a liquid stream in applications other than landfills as well as a filter medium for liquid streams in landfill operations.

A further advantage of the present invention resides in the fact that construction and demolition debris includes items, such as cement, concrete, plaster board and the like, containing calcium oxide or lime. The presence of these ingredients in a daily cover layer thus advantageously reduces the acidity level of the leachate reaching the bottom of the landfill site.

The product of the invention comprising the converted or recycled construction and demolition debris may also be used as daily cover in a novel municipal solid waste landfill or sanitary landfill construction made according to the present invention. Other uses according to the invention of the converted or recycled construction and demolition debris include roadbeds, especially temporary roadbeds, soil stabilization and/or soil erosion control, a soil nutrient or topsoil, especially when mixed with fly ash or sludge, and other earth engineering applications.

With the foregoing and other objects, advantages and features of the invention that will become hereinafter apparent, the nature of the invention may be more clearly understood by reference to the following detailed description of the invention, the appended claims and to the attached drawings.

DETAILED DESCRIPTION OF THE INVENTION

Figure 1:
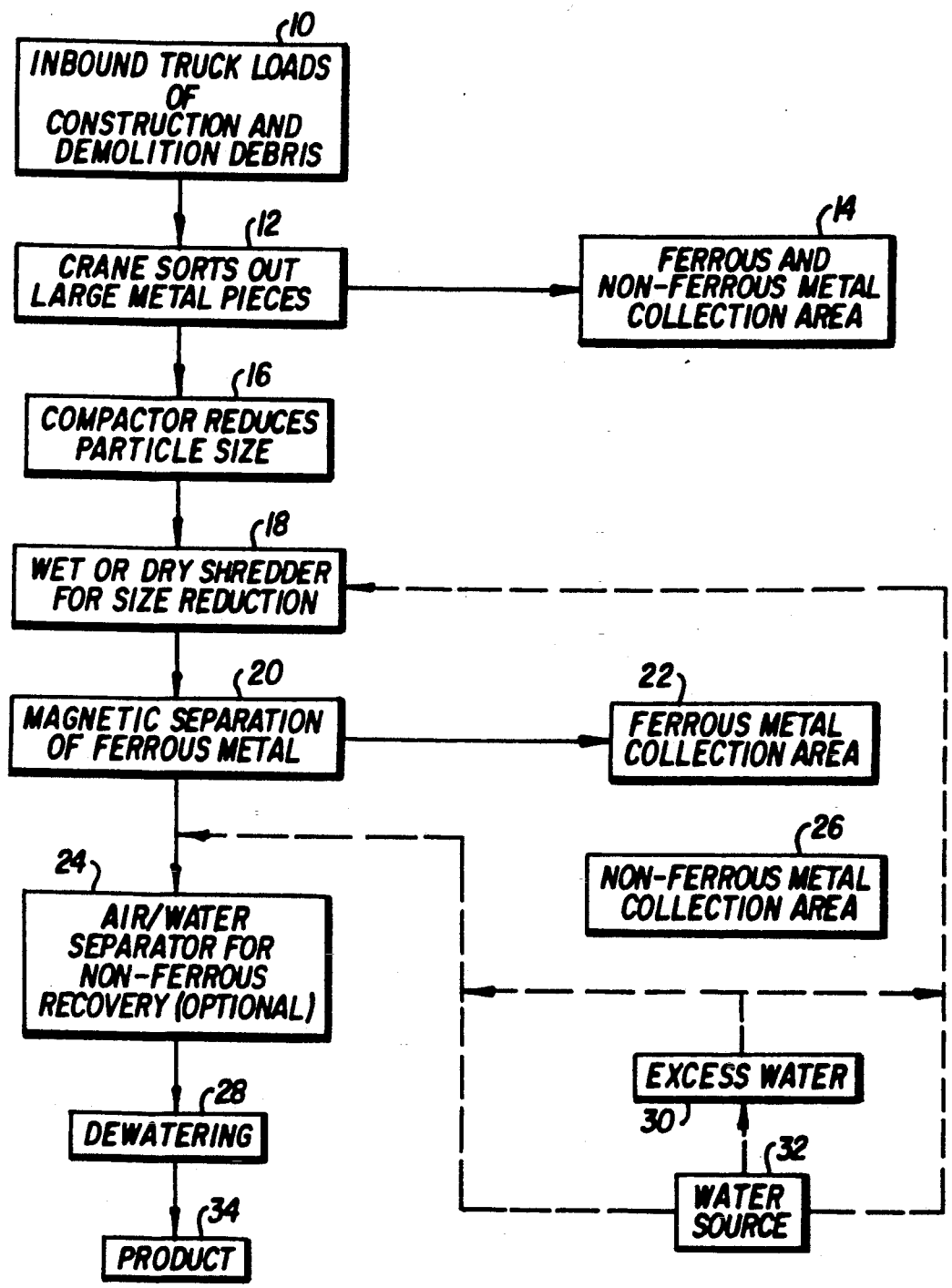
FIG. 1 is a flow diagram in block form showing the present invention in the stages which can be used in the course of recycling the construction and demolition debris into a product.

Referring now to FIG. 1 wherein there is illustrated a flow diagram in block form showing the preferred stages utilized in the course of recycling construction and demolition debris according to the present invention.

The process begins with the transport of construction and demolition debris to a processing center as shown in block 10 of the drawing. After the construction and demolition debris arrives at the processing center, large pieces of metal are removed from the debris by a crane and placed in a collection area as shown in blocks 12 and 14 of FIG. 1.

The balance of the material is then moved to a "compacting" area where it is compacted as seen in block 16 of FIG. 1. Compacting is the process of reducing the size of the material ("presizing") to allow it to be more efficiently fed to and processed by a shredder. A wheel compactor machine is typically used for compacting. One suitable machine that has been found effective in this compacting or presizing process is the Ingersoll Rand 750 Wheel Landfill Compactor. This compactor has spiked wheels which grind and cut the debris into smaller pieces in the process of compacting it. Other types of compacting machines may also be used.

After compacting, the material is fed into a shredding apparatus as shown in block 18 where it is reduced to even smaller pieces having an average particle size of six inches or less and preferably an average particle size of three inches or less. As used herein, "average particle size" means the average sizes of all particles where the particle size is determined by the average of the particle dimensions. Thus, an individual particle may have a dimension well in excess of six inches so long as the average dimensions of that particle and all other particles average less than six inches, or preferably three inches.

The compacted debris is loaded onto a steel belt conveyor which transports the material into the inlet of the shredder. One shredder which has been found to be especially suitable for purposes of the invention is an automotive shredder known as the Newell Super Heavy Duty Shredder Model No. 80104TBD manufactured by Newell Industries, Inc. of San Antonio, Tex.

The Newell shredder has a rotor diameter of 80" and a width of 104" and is powered by a 3000 hp electric motor. The Newell machine is configured as a "wet shredder" because water is added directly into the shredding chamber which houses the rotor in order to prevent the emission of large clouds of dust that would otherwise be generated during the shredding process. Other shredders and crushers, including wet and dry shredders and crushers, may also be used so long as the required average particle size is attained. Super heavy duty shredders of the general type described above are particularly preferred because of their ruggedness and capacity to receive unshreddables without damage and to reduce the debris to an appropriate particle size.

To more efficiently reduce the construction and demolition debris to the appropriate particle size, ferrous metal items may be optionally added as a separate input stream to the shredder. Such additional ferrous metal items function in the shredder in a manner similar to the balls in a ball mill to enhance the shredding process.

After shredding, the shredded material preferably undergoes a magnetic separation process as shown in blocks 20 and 22 to remove ferrous metal which can be of commercial value. The magnetic separator is preferably a drum type electromagnetic separator of conventional design. After ferrous metals are removed, the shredded debris optionally undergoes an air or water separation process as shown in blocks 24 and 26 to recover valuable non-ferrous metals such as copper, aluminum, etc.

If a wet shredder is used, the shredded, non-metallic debris is then dewatered, if necessary, as shown in block 28 to remove excess water so that the resulting product has an acceptable moisture content. If a dry shredder is used, water is added to moisten the material to a desired moisture content so as to give it sufficient weight and consistency for use as daily cover or for use in other applications according to the invention. The moisture content may be in the range of about 5% to about 45% by weight, is preferably in the range of about 10% to 14% by weight and most preferably about 12% by weight. Excess water from the dewatering step is preferably reused in the shredding step 18 if a wet shredder is employed or piped to the water separation step 24 if a dry shredder is used. If a dry shredder is used in the shredding step 18 and the water separation step 24 is omitted, water 30 may be added to the shredded debris to raise its moisture content to a level above the desired range before passing it to the dewatering step 28 to adjust the moisture content to the desired range. Dewatering is preferably accomplished in a dewatering press, but may be accomplished by other means or by natural drainage. A water source 32 is provided for supplying additional water to the excess water 30 or for directly supplying the wet shredder 18 and/or the water separator 24. Water flow is represented by dashed lines in the drawing.

The output of the dewatering step 28 is a product 34 in the form of moist recycled construction and demolition debris. The article produced according to the method of the present invention is suitable as an alternative daily cover for all types of landfills including, municipal solid waste, land clearing debris, rubble, and industrial waste landfills, and for other uses as described hereinafter.

In the use of the product 34 in a landfill as daily cover, it may be desirable to mix a quantity of ash with the product to aid in neutralizing acids in the landfill, especially in the leachate reaching the bottom of the landfill site. Such addition of ash is particularly advantageous in cases where the quantity of cement, concrete and plaster board in the construction and demolition debris is at a low level. The ash may be added to the product either before or after shredding.

Figure 2:
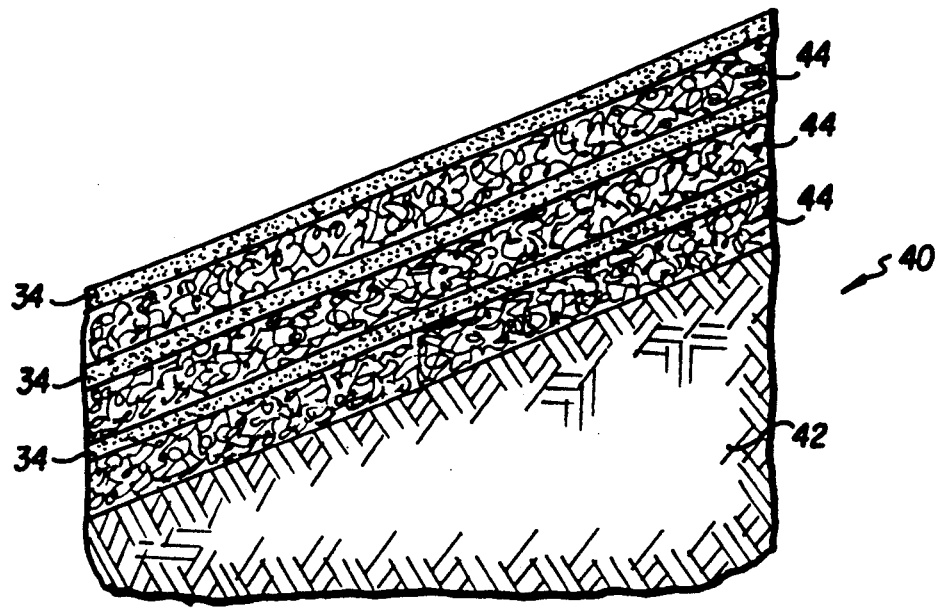
FIG. 2 is a fragmentary cross-section of a municipal solid waste landfill structure using the product made according to the method of the invention.

FIG. 2 illustrates a fragmentary cross-section of a municipal solid waste landfill 40 in which the product 34 made according to the process described above is used as a daily cover. The landfill 40 comprises a base 42 which may be a landfill liner, a previously deposited landfill cell, an intermediate cover or the like. Landfill 40 comprises a plurality of alternating layers of shredded municipal solid waste 44 and the shredded product 34 used, in this instance, as daily cover for the shredded municipal solid waste. Solid waste 44 may be shredded by any known wet or dry shredding process, as well as by the process described herein.

The landfill 40 of the present invention advantageously provides a compact, highly compressible landfill that serves to dispose, of both municipal solid waste and construction and demolition debris in the same landfill with minimum use of earthen material in the landfill design.

Figure 3:
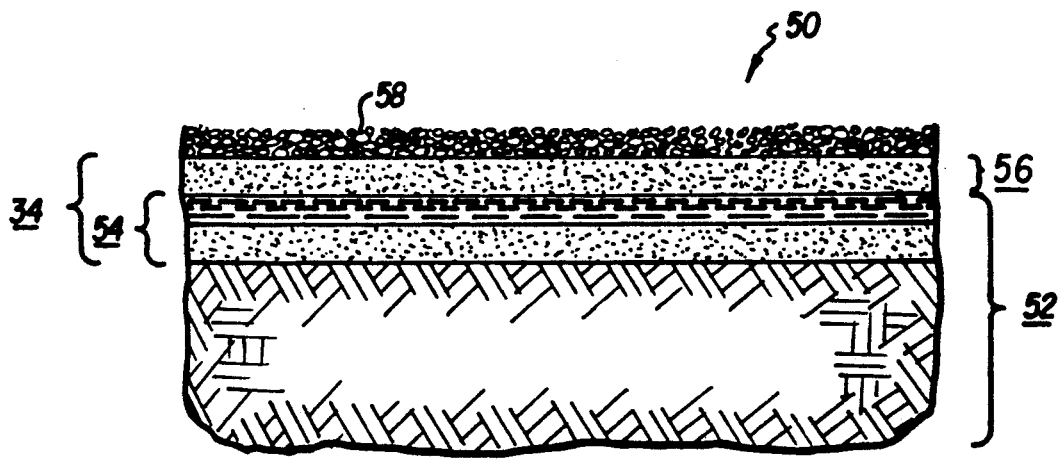
FIG. 3 is a fragmentary cross-section of a temporary roadbed using the product made according to the method of the invention.

FIG. 3 illustrates an embodiment of a temporary roadbed 50 in which the product 34 made according to the process described above is used to stabilize a temporary roadbed, especially such roadbeds in wet or marshy areas. Examples of locations where such temporary roadbeds are advantageously used include landfill sites, logging areas, construction sites, off-the-road recreation areas and the like. The temporary roadbed 50 is formed over the existing ground or soil base 52 which may be covered or partly covered by surface or standing water or may be moisture-laden, muddy or rutted from vehicular traffic. The shredded product 34 is spread over the base 52 in layered amounts sufficient for the initial layer or layers of product 34 to mix with the soil and soak up the moisture in a layer or region 54. An additional layer or layers of product 34 are spread over the region 54 to form a compressible road surface 56 over which vehicular traffic may pass without difficulty.

If water or moisture conditions recur, additional layers of the product 34 may be spread over the surface of roadbed 50. A layer 58 of gravel or aggregate may also be spread over the top layer of product 34 although such layer 58 is not necessary.

A further related application of the product 34 is in soil stabilization. The product may be spread upon large or small land areas where soil stabilization or erosion control is desired. Since the product 34 has the capacity to absorb substantial amounts of water, it may be applied to slopes or grades where water run-off is a problem. According to the invention, the product 34 is spread over the area to be treated and is preferably mixed with the underlying soil surface by equipment such as a bulldozer, front end loader or the like.

Because of its sponge-like qualities, the product 34 may also be used to soak up spills of oil and other petroleum products on land areas by spreading the product, mixing it with the spill and the underlying contaminated soil and hauling the resultant mixture to an appropriate waste disposal site.

The product 34 may also be advantageously combined in varying amounts with fly ash and used as a soil nutrient or with sludge and used as a soil nutrient or topsoil. While the particular ratio of the quantity of product 34 to the quantity of fly ash or sludge is not critical, mixtures of 10%-50% or more by weight of fly ash or sludge are beneficial.

Although certain presently preferred embodiments of the invention have been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

What we claim is:

1. A method of disposing of municipal solid waste and construction and demolition debris in a landfill comprising the steps of:
    dumping a first layer of shredded municipal solid waste on a landfill site; and
    applying a second daily cover layer over said first layer, said second layer comprising construction and demolition debris to which water is added during processing of the debris through a shredder into a moist shredded product.

2. The method of claim 1, including the step of applying alternating layers of shredded municipal solid waste and shredded construction and demolition debris.

3. The method of claim 1, including the step of adding ash to the shredded construction and demolition debris of the second layer.

4. A method of making a roadbed using construction and demolition debris comprising the steps of processing construction and demolition debris through a shredder, adding moisture to the debris during processing of the debris through the shredder, spreading a layer of the shredded construction and demolition debris over an earthen surface and mixing a portion of the shredded construction and demolition debris with a portion of the earthen surface to form a roadbed.

5. The method of claim 4, including the step of spreading a layer of gravel or aggregate over said layer of shredded construction and demolition debris.

6. A method of soil stabilization comprising the steps of processing construction and demolition debris through a shredder, adding moisture to the debris during processing of the debris through the shredder, spreading a layer of the shredded construction and demolition debris over a soil surface to be stabilized and mixing said shredded construction and demolition debris with at least a portion of the soil of said surface.

7. A method of making a soil nutrient comprising the steps of processing construction and demolition debris through a shredder, adding moisture to the debris during processing of the debris through the shredder, mixing the shredded construction and demolition debris with a quantity of fly ash or sludge and applying the mixture to an area of soil.

8. The method of claim 7, wherein the amount of fly ash or sludge in the mixture is 10% to 50% by weight.

9. The method of claim 1, including the step of compacting the debris prior to processing the debris through the shredder.

10. The method of claim 4, including the step of compacting the debris prior to processing the debris through the shredder.

11. The method of claim 6, including the step of compacting the debris prior to processing the debris through the shredder.

12. The method of claim 7, including the step of compacting the debris prior to processing the debris through the shredder.

13. The method of claim 1, wherein water is added to the debris to a moisture content of between about 5% to about 45% by weight.

14. The method of claim 4, wherein water is added to the debris to a moisture content of between about 5% to about 45% by weight.

15. The method of claim 6, wherein water is added to the debris to a moisture content of between about 5% to about 45% by weight.

16. The method of claim 7, wherein water is added to the debris to a moisture content of between about 5% to about 45% by weight.

* * * * *